(12) United States Patent
Shirai

(10) Patent No.: US 11,546,547 B2
(45) Date of Patent: Jan. 3, 2023

(54) IMAGE RECORDING DEVICE FOR A VEHICLE AND IMAGE RECORDING METHOD FOR A VEHICLE

(71) Applicant: TOYOTA JIDOSHA KABUSHIKI KAISHA, Toyota (JP)

(72) Inventor: Ryo Shirai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/370,094

(22) Filed: Jul. 8, 2021

(65) Prior Publication Data
US 2022/0060654 A1 Feb. 24, 2022

(30) Foreign Application Priority Data

Aug. 18, 2020 (JP) .............................. JP2020-138224

(51) Int. Cl.
*H04N 5/91* (2006.01)
*H04N 5/272* (2006.01)
(Continued)

(52) U.S. Cl.
CPC ................. *H04N 5/91* (2013.01); *B60R 1/00* (2013.01); *G06T 11/203* (2013.01); *H04N 5/272* (2013.01); *B60R 2300/10* (2013.01); *B60R 2300/20* (2013.01); *B60R 2300/30* (2013.01); *B60R 2300/60* (2013.01); *G01S 13/931* (2013.01);
(Continued)

(58) Field of Classification Search
CPC . H04N 5/91; H04N 5/272; B60R 1/00; B60R 2300/10; B60R 2300/20; B60R 2300/30; B60R 2300/60; G06T 11/203; G06T 2210/62
See application file for complete search history.

(56) References Cited

U.S. PATENT DOCUMENTS

2017/0192423 A1* 7/2017 Rust ..................... G05D 1/0238
2017/0253237 A1* 9/2017 Diessner ............... B60W 10/04
(Continued)

FOREIGN PATENT DOCUMENTS

JP 2008-134844 A 6/2008
JP 2011-096063 A 5/2011
(Continued)

*Primary Examiner* — Terrell M Robinson
(74) *Attorney, Agent, or Firm* — Sughrue Mion, PLLC

(57) ABSTRACT

An image recording device for a vehicle includes: an image acquisition section configured to acquire a surroundings image in which vehicle surroundings have been captured; an image display section configured to display an overlaid image in a display region inside a vehicle cabin in a case in which a predetermined assisted driving condition has been satisfied, the overlaid image being configured by an assistance image overlaid on the surroundings image acquired by the image acquisition section; and an image recording section configured to record the overlaid image at a recording section during an assisted driving state in which the overlaid image is being displayed in the display region, and, in a case in which the assisted driving state is not in effect, record at the recording section an image that has been subjected to image processing including processing to render a state in which the assistance image is not visible.

3 Claims, 9 Drawing Sheets

(51) Int. Cl.
*G06T 11/20* (2006.01)
*B60R 1/00* (2022.01)
*H04N 5/247* (2006.01)
*G01S 13/931* (2020.01)

(52) U.S. Cl.
CPC ............ *G01S 2013/93271* (2020.01); *G01S 2013/93272* (2020.01); *G06T 2210/62* (2013.01); *H04N 5/247* (2013.01)

(56) References Cited

U.S. PATENT DOCUMENTS

| | | | |
|---|---|---|---|
| 2018/0268227 A1 | 9/2018 | Nakada | |
| 2019/0004538 A1* | 1/2019 | Wood | G01S 17/931 |
| 2019/0072668 A1* | 3/2019 | Duque Biarge | G01S 13/931 |
| 2019/0179305 A1* | 6/2019 | Magzimof | G05D 1/0038 |
| 2021/0366285 A1* | 11/2021 | Matsuda | B62D 15/0285 |

FOREIGN PATENT DOCUMENTS

| | | |
|---|---|---|
| JP | 5966131 B2 | 8/2016 |
| JP | 2018-152785 A | 9/2018 |

\* cited by examiner

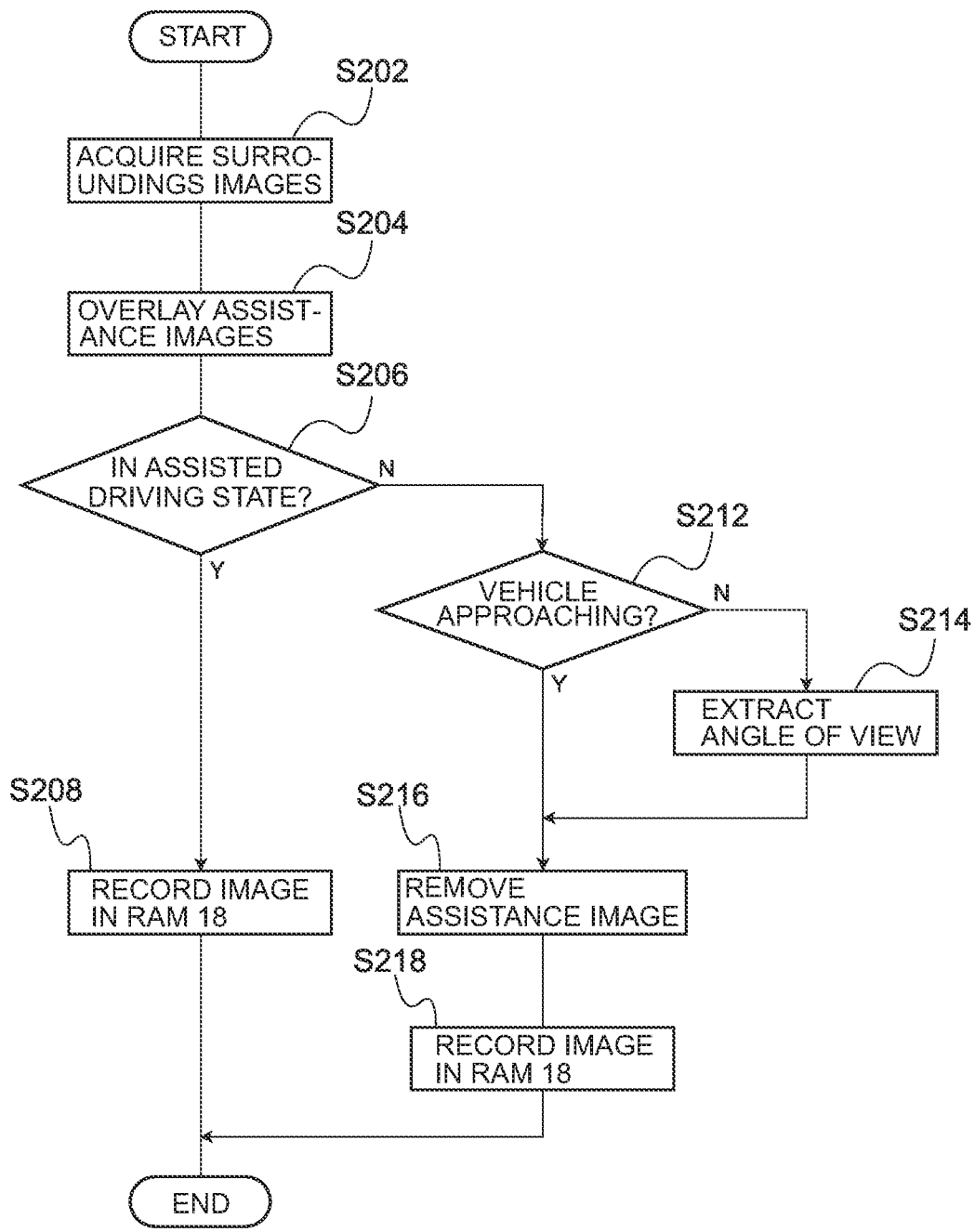

IMAGE RECORDING DEVICE FOR A VEHICLE AND IMAGE RECORDING METHOD FOR A VEHICLE

CROSS-REFERENCE TO RELATED APPLICATION

This application is based on and claims priority under 35 USC 119 from Japanese Patent Application No. 2020-138224 filed on Aug. 18, 2020, the disclosure of which is incorporated by reference herein.

BACKGROUND

Technical Field

The present disclosure relates to a image recording device for a vehicle and a image recording method for a vehicle.

Related Art

Japanese Patent Application Laid-Open (JP-A) No. 2008-134844 discloses a drive recorder that captures and records images of vehicle surroundings. In JP-A No. 2008-134844, in cases in which a traffic signal included in an image captured by a camera is in a non-illuminated state, an image acquisition cycle is shifted in order to record the traffic signal when in an illuminated state.

Technology also exists in which driving assistance such as parking assistance is performed by capturing and displaying a surroundings image of vehicle surroundings. Since assistance images such as icons or guide lines are displayed overlaid on the surroundings image displayed during driving assistance, the surroundings image is unsuitable for use as a recorded image for recording by a drive recorder. However, installing a dedicated camera or the like to capture images for recording by the drive recorder could lead to an unnecessary increase in costs.

SUMMARY

The present disclosure provides a image recording device for a vehicle and a image recording method for a vehicle capable of recording images for a drive recorder at low cost.

A first aspect of the present disclosure is a image recording device for a vehicle including: an image acquisition section configured to acquire a surroundings image in which vehicle surroundings have been captured; an image display section configured to display an overlaid image in a display region inside a vehicle cabin in a case in which a predetermined assisted driving condition has been satisfied, the overlaid image being configured by an assistance image overlaid on the surroundings image acquired by the image acquisition section; and an image recording section configured to record the overlaid image at a recording section during an assisted driving state in which the overlaid image is being displayed in the display region, and, in a case in which the assisted driving state is not in effect, record at the recording section an image that has been subjected to image processing including processing to render a state in which the assistance image is not visible.

In the image recording device for a vehicle of the first aspect, the image acquisition section acquires a surroundings image of the vehicle surroundings. The image display section displays an overlaid image in the display region inside the vehicle cabin when the predetermined assisted driving condition has been satisfied. The overlaid image is configured by an assistance image overlaid on the surroundings image acquired by the image acquisition section. Driving assistance is thus provided to an occupant by displaying the overlaid image in the display region.

During the assisted driving state in which the overlaid image is being displayed in the display region, the image recording section records the overlaid image in the recording section. Moreover, in a cases in which the assisted driving state is not in effect, the image recording section records at the recording section an image that has been subjected to image processing including processing to render a state in which the assistance image is not visible. This approach is capable of suppressing a situation in which an assistance image overlaid on the image recorded in the recording section makes the situation in the vehicle surroundings difficult to see. Note that the "assistance image" referred to here encompasses a broad range of images, and may include guide lines displayed when providing vehicle parking assistance, an icon indicating the direction of an approaching obstacle, an arrow indicating the direction of progress of the vehicle, or an icon indicating an operable switch. Moreover, the "processing to render a state in which the assistance image is not visible" referred to here is not limited to processing that renders a state in which the assistance image cannot be seen at all. For example, the concept encompasses a broad range of processing to improve the visibility of the surroundings image in comparison to the overlaid image, for example processing to render an assistance image semi-transparent.

In a second aspect of the present disclosure, in the first aspect, in a case in which the assisted driving state is not in effect, the image recording section may be configured to record at the recording section only the surroundings image, with the assistance image having been removed from the overlaid image.

In the image recording device for a vehicle of the second aspect, in a case in which the assisted driving state is not in effect, only the surroundings image is recorded at the recording section, with the assistance image having been removed. This enables any annoyance caused by overlaid assistance images, for example when checking recorded images, to be alleviated.

In a third aspect of the present disclosure, in the first aspect, in a case in which the assisted driving state is not in effect, the image recording section is configured to record at the recording section an image that has been subjected to image processing to make the assistance image transparent or semi-transparent.

In the image recording device for a vehicle of the third aspect, in a case in which the assisted driving state is not in effect, an image in which the assistance image has been rendered transparent or semi-transparent is recorded at the recording section. This enables visibility of obstacles and so on in the vehicle surroundings to be improved when checking recorded images or the like in comparison to overlaid images on which image processing has not been performed.

In a fourth aspect of the present disclosure, in any one of the first through third aspects, in a case in which the assisted driving state is not in effect, the image recording section may be configured to record at the recording section an extracted image that has been subjected to angle of view extraction processing to extract a partial angle of view from the overlaid image that is employed for display in the display region when the assisted driving state is in effect.

In the image recording device for a vehicle of the fourth aspect, in a case in which the assisted driving state is not in effect, a partial angle of view is extracted from the overlaid image, and the resulting extracted image is recorded at the recording section. Note that an image with a narrow angle of view generally appears more natural than an image with a wide angle of view. Thus, due to recording as a recorded image an extracted image with a narrow angle of view extracted from the overlaid image as a partial angle of view, the recorded image will have a more natural appearance when performing image checking or the like.

In a fifth aspect of the present disclosure, in the fourth aspect, may further comprising: an obstacle acquisition section configured to acquire information regarding an obstacle from a surroundings detection sensor configured to detect obstacles in vehicle surroundings, wherein: in a case in which an obstacle approaching a host vehicle has been detected outside an angle of view of the extracted image based on information acquired by the obstacle acquisition section, the image recording section is configured to record at the recording section an image that has not been subjected to the angle of view extraction processing.

In the image recording device for a vehicle of the fifth aspect, the angle of view extraction processing is not performed in cases in which an obstacle approaching an host vehicle has been detected outside the angle of view of the extracted image. Thus, an image with a wide angle of view can be recorded, thereby enabling the positional relationship between the obstacle and the host vehicle to be checked using this recorded image.

A sixth aspect of the present disclosure is a image recording method for a vehicle including: acquiring a surroundings image in which vehicle surroundings have been captured; displaying an overlaid image in a display region inside a vehicle cabin in a case in which a predetermined assisted driving condition has been satisfied, the overlaid image being configured by an assistance image overlaid on the acquired surroundings image; and recording the overlaid image at a recording section during an assisted driving state in which the overlaid image is being displayed in the display region, and, in a case in which the assisted driving state is not in effect, recording at the recording section an image that has been subjected to image processing including processing to render a state in which the assistance image is not visible.

In the image recording method for a vehicle of the sixth aspect, in a case in which the assisted driving state is not in effect, an image that has been subjected to image processing including processing to render a state in which the assistance image is not visible is recorded in the recording section. This approach is capable of suppressing a situation in which an assistance image overlaid on the image recorded at the recording section makes the situation in the vehicle surroundings difficult to see.

The image recording device for a vehicle and the image recording method for a vehicle according to the present disclosure are capable of recording images for a drive recorder at low cost.

BRIEF DESCRIPTION OF THE DRAWINGS

Exemplary embodiments of the present disclosure will be described in detail based on the following figures, wherein:

FIG. 9 is a flowchart illustrating an example of a flow of image recording processing of the second exemplary embodiment.

DETAILED DESCRIPTION

First Exemplary Embodiment

Explanation follows regarding a image recording device for a vehicle 10 according to a first exemplary embodiment, with reference to the drawings. Note that dimensions in some of the drawings have been exaggerated for ease of explanation.

Hardware Configuration of Image Recording Device for a Vehicle 10

Figure 1:
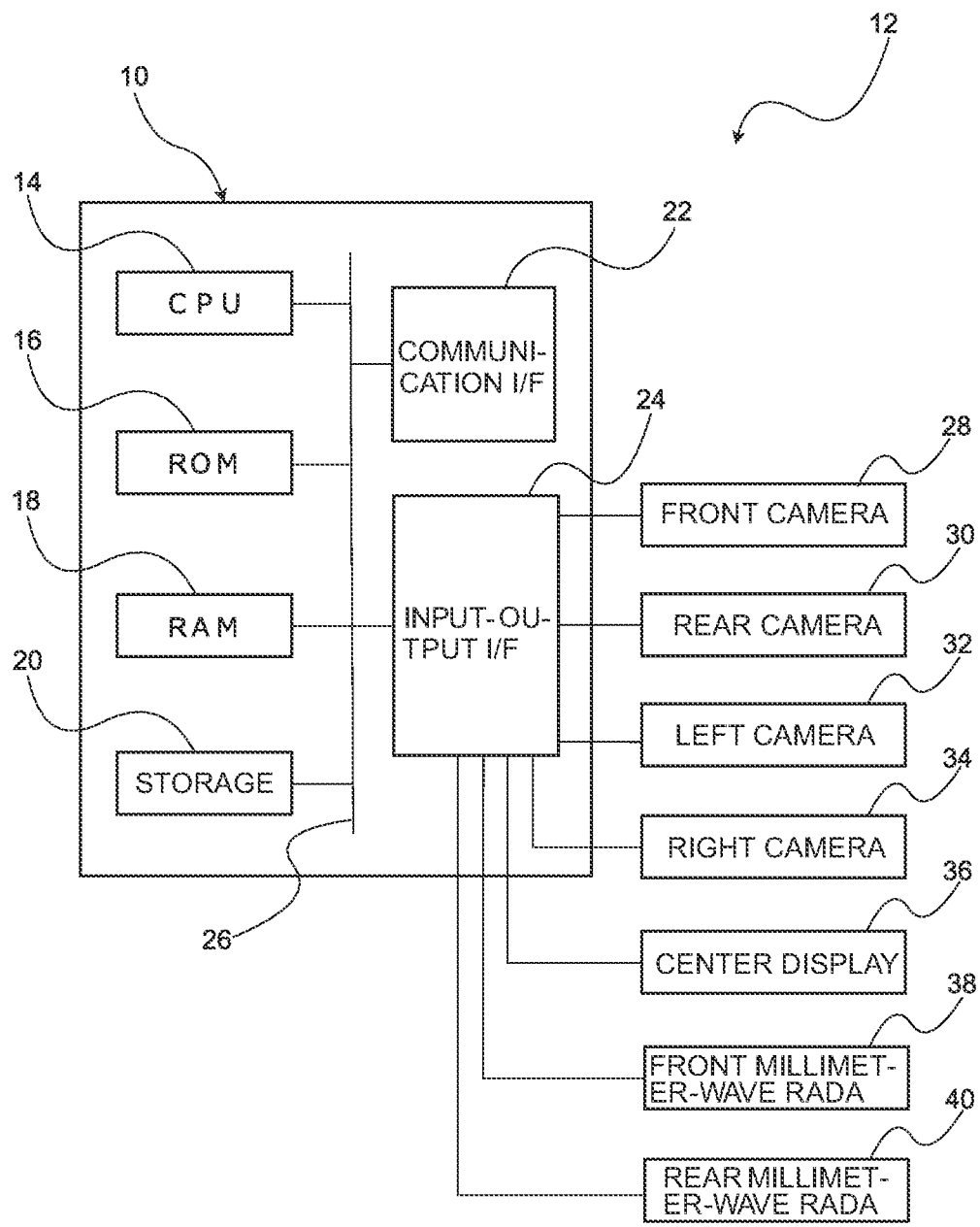
FIG. 1 is a block diagram illustrating a hardware configuration of a image recording device for a vehicle according to a first exemplary embodiment.

As illustrated in FIG. 1, the image recording device for a vehicle 10 of the present exemplary embodiment is configured including a central processing unit (CPU; processor) 14, read only memory (ROM) 16, random access memory (RAM) 18, storage 20 serving as a recording section, a communication interface 22, and an input-output interface 24. These respective configurations are connected so as to be capable of communicating with each other through a bus 26. As an example, the image recording device for a vehicle 10 of the present exemplary embodiment configures part of an electronic control unit (ECU) installed in a vehicle 12.

The CPU 14 is a central processing unit that executes various programs and controls respective sections. Namely, the CPU 14 reads a program from the ROM 16 or the storage 20, and executes the program in the RAM 18, serving as a workspace. The CPU 14 controls the respective configurations and performs various computation processing according to the program recorded in the ROM 16 or the storage 20.

The ROM 16 is a non-transitory recording medium that holds various programs and various data. The RAM 18 is a non-transitory recording medium that serves as a workspace to temporarily store programs and data. The storage 20 is configured by a hard disk drive (HDD) or a solid state drive (SSD), and is a non-transitory recording medium that holds various programs including an operating system, and various data. An image recording program for performing image recording processing, as well as images of vehicle surroundings and so on are saved in the ROM 16 or the storage 20 of the present exemplary embodiment. Images of vehicle surroundings and so on are also saved in the RAM 18 of the present exemplary embodiment.

The communication interface 22 is an interface allowing the image recording device for a vehicle 10 to communicate over a computer network, and a protocol such as 5G, LTE, Wi-Fi (registered trademark), or Ethernet (registered trademark) may be employed therefor.

A front camera 28, a rear camera 30, a left camera 32, a right camera 34, a center display 36, a front millimeter-wave radar 38, and a rear millimeter-wave radar 40 are connected to the input-output interface 24. The front millimeter-wave radar 38 and the rear millimeter-wave radar 40 both correspond to "surroundings detection sensors" of the present disclosure. A non-illustrated sensor set including an acceleration sensor, a load sensor, and so on is also connected to the input-output interface 24.

Figure 2:
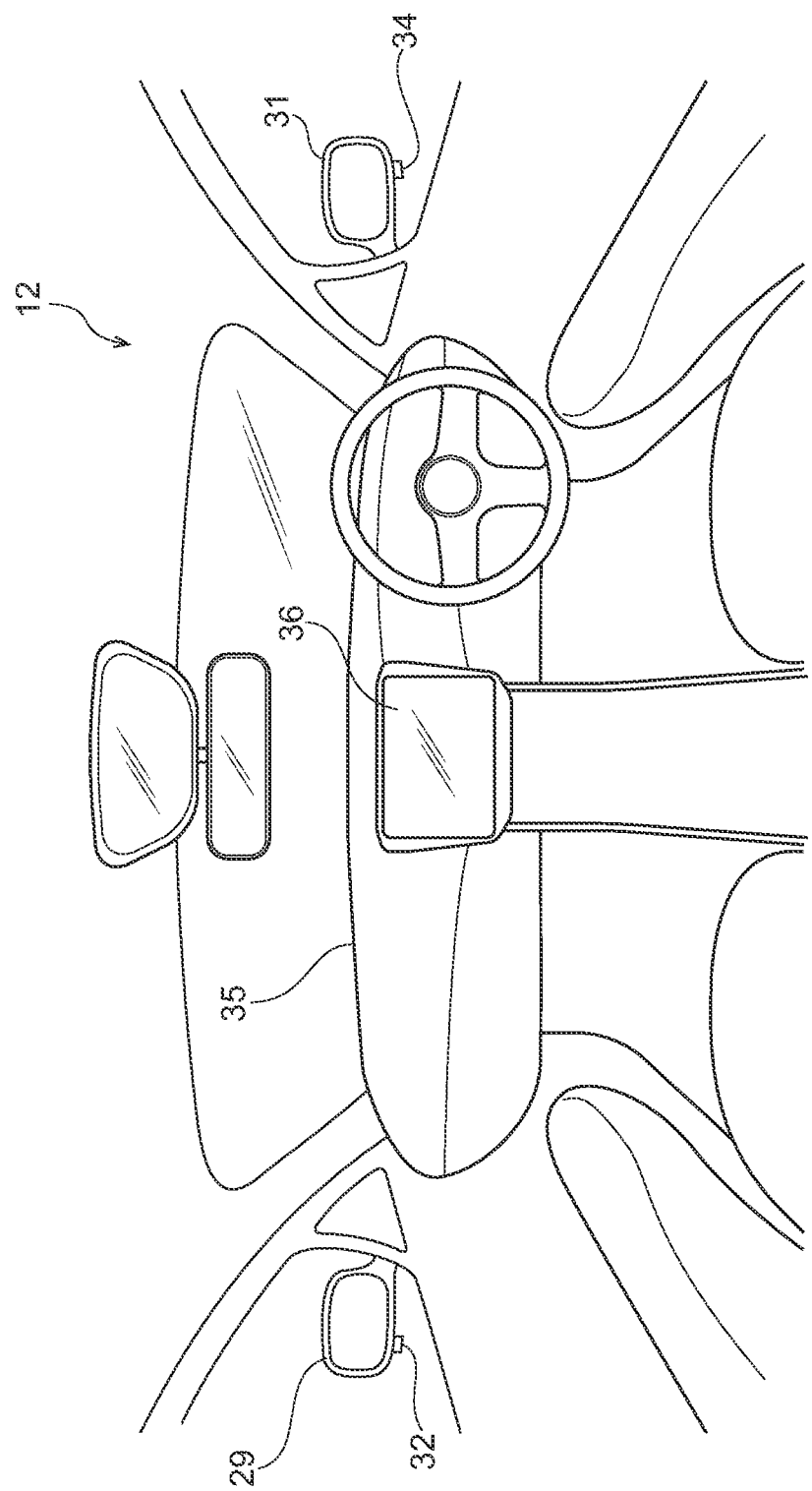
FIG. 2 is diagram illustrating a front section inside a cabin of a vehicle applied with a image recording device for a vehicle according to the first exemplary embodiment, as viewed from a vehicle rear side.

As illustrated in FIG. 2, the left camera 32 is provided on a left side of the vehicle 12. Specifically, a left door mirror 29 is provided on the left side of the vehicle 12, and the left camera 32 is attached to a lower end portion of the left door mirror 29.

The right camera 34 is provided on a right side of the vehicle 12. Specifically, a right door mirror 31 is provided on the right side of the vehicle 12, and the right camera 34 is attached to a lower end portion of the right door mirror 31.

Figure 3:
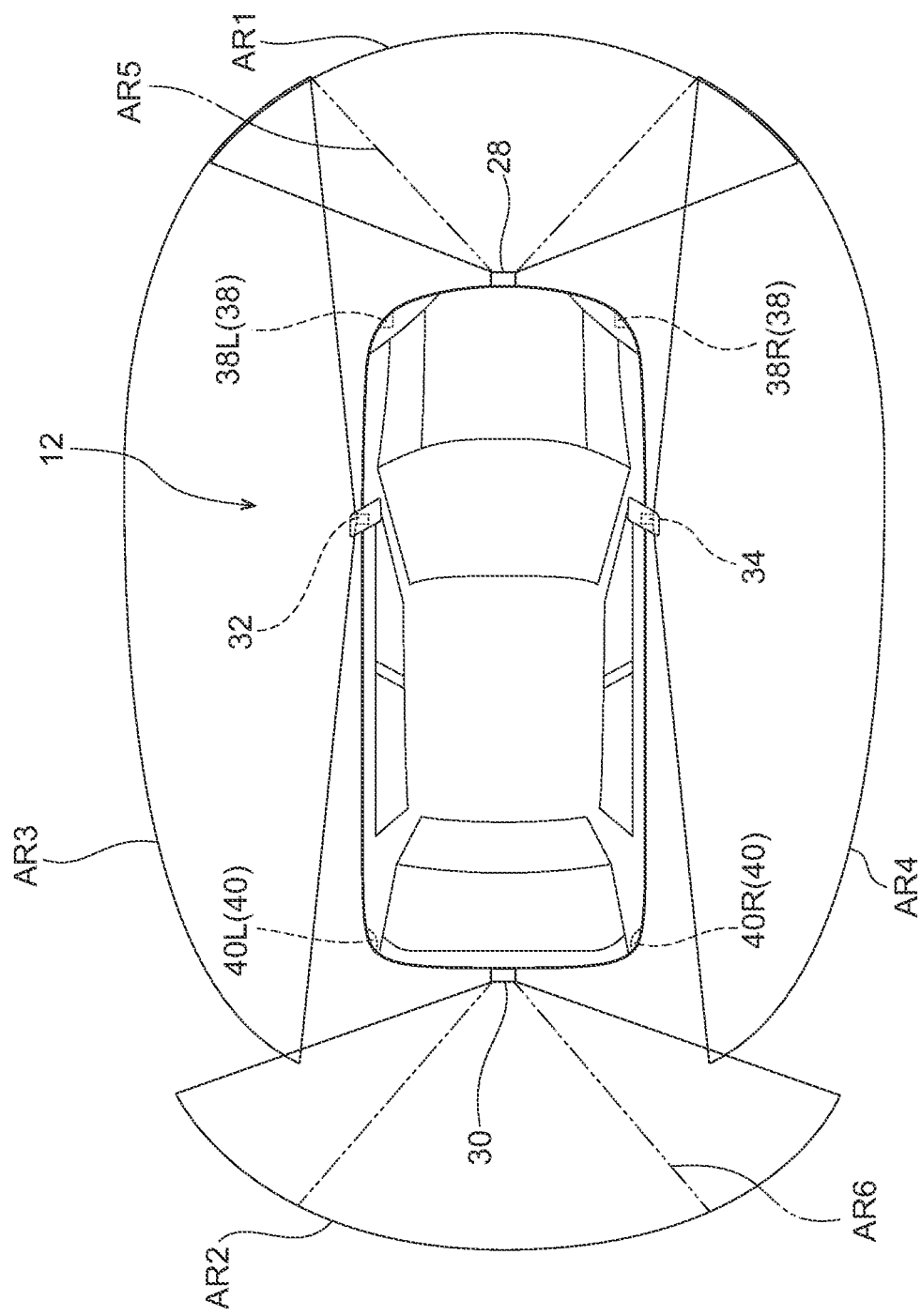
FIG. 3 is a plan view illustrating a vehicle applied with a image recording device for a vehicle according to the first exemplary embodiment.

As illustrated in FIG. 3, the front camera 28 is provided to a front end portion of the vehicle 12. The front camera 28 may for example be attached to non-illustrated front bumper reinforcement so as to image forward from the vehicle. An angle of view AR1 of the front camera 28 is substantially fan shaped, spreading out in a vehicle width direction on progression forward away from the vehicle.

The rear camera 30 is provided to a rear end portion of the vehicle 12. The rear camera 30 may for example be attached to non-illustrated rear bumper reinforcement so as to image rearward from the vehicle. An angle of view AR2 of the rear camera 30 is substantially fan shaped, spreading out in the vehicle width direction on progression rearward away from the vehicle.

An angle of view AR3 of the left camera 32 covers the entirety of a region to the left of the vehicle 12 such that the angle of view AR3 partially overlaps the angle of view AR1 of the front camera 28 and the angle of view AR2 of the rear camera 30.

An angle of view AR4 of the right camera 34 covers the entirety of a region to the right of the vehicle 12 such that the angle of view AR4 partially overlaps the angle of view AR1 of the front camera 28 and the angle of view AR2 of the rear camera 30. Merging respective images captured by the front camera 28, the rear camera 30, the left camera 32, and the right camera 34 by performing predetermined processing thereon thereby enables the acquisition of a reproduced image as if viewed from directly above the vehicle 12. Note that as an example, the rear camera 30 of the present exemplary embodiment also functions as a camera for a reversing guidance monitor that provides assistance when parking the vehicle 12.

The front millimeter-wave radar 38 is configured including a front-left millimeter-wave radar 38L and a front-right millimeter-wave radar 38R. The front-left millimeter-wave radar 38L is provided on a front-left side corner of the vehicle 12, and is capable of detecting obstacles over a wide range toward the front and left from the vehicle 12. The front-right millimeter-wave radar 38R is provided on a front-right side corner of the vehicle 12, and is capable of detecting obstacles over a wide range toward the front and right from the vehicle 12.

The rear millimeter-wave radar 40 is configured including a rear-left millimeter-wave radar 40L and a rear-right millimeter-wave radar 40R. The rear-left millimeter-wave radar 40L is provided on a rear-left side corner of the vehicle 12, and is capable of detecting obstacles over a wide range toward the rear and left from the vehicle 12. The rear-right millimeter-wave radar 40R is provided on a rear-right side corner of the vehicle 12, and is capable of detecting obstacles over a wide range toward the rear and right from the vehicle 12.

As illustrated in FIG. 2, the center display 36 is provided in a front section of a vehicle cabin. The center display 36 is provided at a vehicle width direction central portion of an instrument panel 35, and various reproduced images are displayed on the center display 36. For example, map information from a navigation system and multimedia information are displayed on the center display 36. Moreover, images of the vehicle surroundings, images related to driving assistance, and so on are displayed on the center display 36 during driving assistance. The center display 36 corresponds to a "display region" according to the present disclosure.

Functional Configuration of Image Recording Device for a Vehicle 10

The image recording device for a vehicle 10 implements various functions using the above-described hardware resources. Explanation follows regarding functional configurations implemented by the image recording device for a vehicle 10, with reference to FIG. 4.

Figure 4:
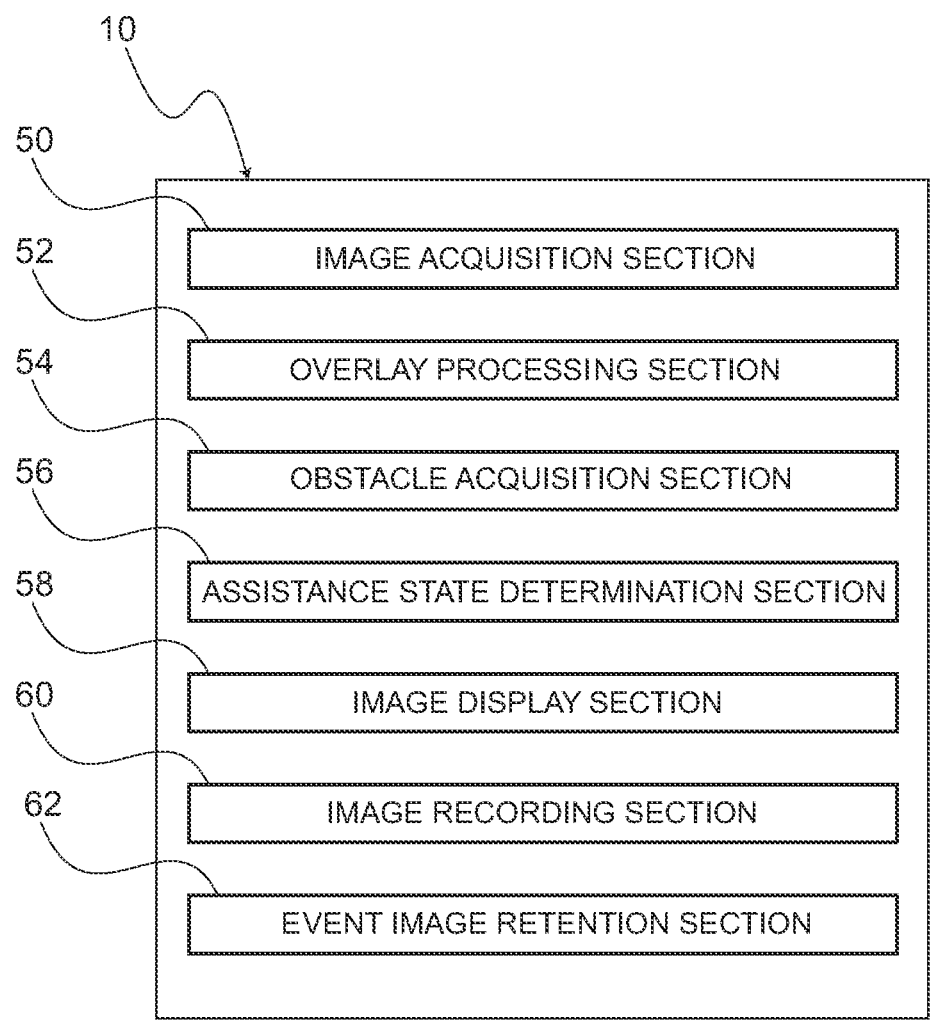
FIG. 4 is a block diagram illustrating functional configuration of a image recording device for a vehicle according to the first exemplary embodiment.

As illustrated in FIG. 4, the image recording device for a vehicle 10 is configured including functional configuration of an image acquisition section 50, an overlay processing section 52, an obstacle acquisition section 54, an assistance state determination section 56, an image display section 58, an image recording section 60, and an event image retention section 62. The respective functional configurations are implemented by the CPU 14 reading and executing a program stored in the ROM 16 or the storage 20.

The image acquisition section 50 acquires surroundings images in which the surroundings of the vehicle 12 are captured. Specifically, the image acquisition section 50 acquires respective images captured by the front camera 28, the rear camera 30, the left camera 32, and the right camera 34.

Figure 5A:
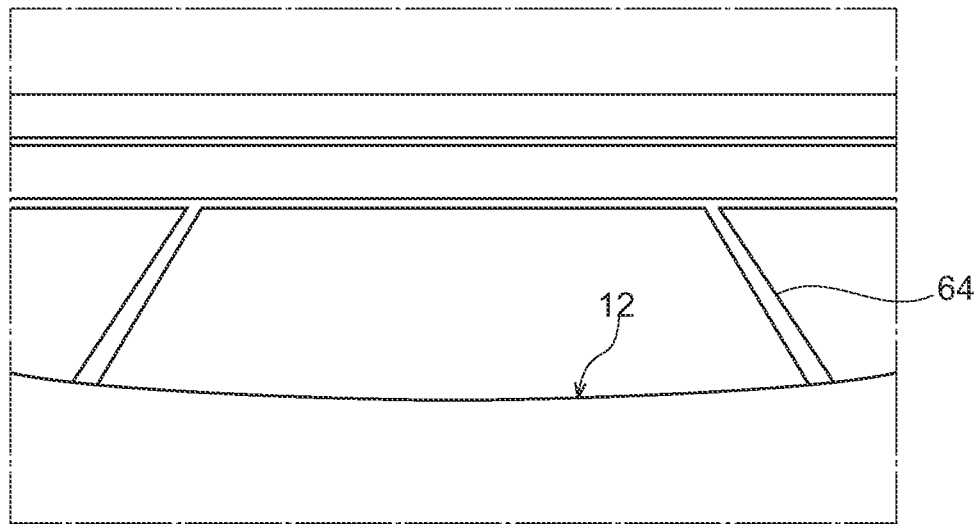
FIG. 5A is a diagram illustrating an example of a surroundings image captured by a rear camera.

The overlay processing section 52 overlays assistance images on the surroundings images acquired by the image acquisition section 50. For example, FIG. 5A illustrates a captured image captured by the rear camera 30. This captured image is acquired by the image acquisition section 50 as a surroundings image. As illustrated in FIG. 5A, a rear end portion of the vehicle 12 is present in the captured image captured by the rear camera 30. White lines 64 indicating a parking space for the vehicle 12 are also present in the captured image captured by the rear camera 30.

Figure 5B:
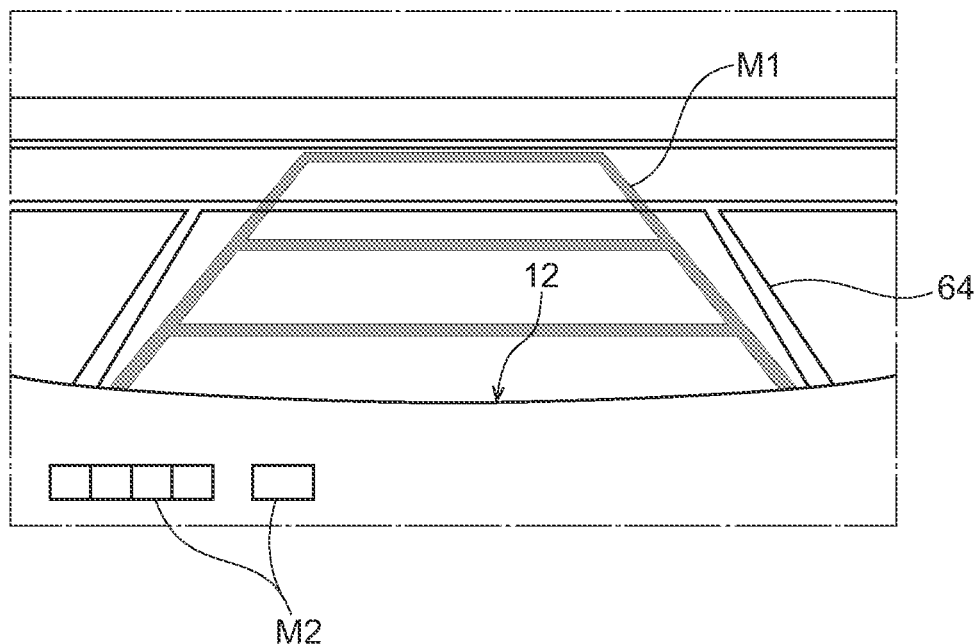
FIG. 5B is a diagram illustrating an overlaid image in which assistance images have been overlaid on the captured image in FIG. 5A.

FIG. 5B illustrates an overlaid image in which guide lines M1, serving as an assistance image, are displayed overlaid on the captured image captured by the rear camera 30. Driving assistance to assist a driver with parking of the vehicle 12 is performed by adjusting the shape of the guide lines M1 according to the orientation of the vehicle 12 and the position of the white lines 64.

Plural icons M2, serving as assistance images, are also overlaid on the display as illustrated in FIG. 5B. In a state in which an overlaid image is being displayed on the center display 36, icons corresponding to operations that an occupant is able to perform are displayed as the icons M2. When the occupant operates a non-illustrated operation switch so as to select a specific icon out of the icons M2, processing corresponding to the selected icon is executed. The icons M2 may include icons displaying states of the vehicle 12 and so on. For example, an icon indicating which direction relative the vehicle 12 is being displayed in the image may be overlaid on the display.

The obstacle acquisition section 54 illustrated in FIG. 4 detects obstacles approaching the vehicle 12. Specifically, the obstacle acquisition section 54 uses the front millimeter-wave radar 38 and the rear millimeter-wave radar 40 to detect approaching obstacles in the surroundings of the vehicle 12.

The assistance state determination section 56 determines whether or not a predetermined assisted driving condition has been satisfied. For example, the assistance state determination section 56 may determine whether or not an assisted driving condition has been satisfied based on a position of a shift lever. Specifically, the assistance state determination section 56 may determine that an assisted driving condition has been satisfied when the shift lever has been moved to a reverse range (R range).

As another example, the assistance state determination section 56 may determine that an assisted driving condition has been satisfied in cases in which a non-illustrated camera switchover switch has been operated. The camera switchover switch is installed to a steering wheel, the instrument panel, or the like, and is a switch enabling a surroundings image of the vehicle 12 to be displayed on the center display 36 at a timing desired by the occupant. The assistance state determination section 56 may determine that an assisted driving condition has been satisfied in cases in which the occupant has operated the camera switchover switch to instruct a vehicle-rearward image to be displayed on the center display 36 during travel.

As another example, the assistance state determination section 56 may determine that an assisted driving condition has been satisfied in cases in which the obstacle acquisition section 54 has detected an approaching obstacle in the surroundings of the vehicle 12. Namely, the assistance state determination section 56 may determine that an assisted driving condition has been satisfied in cases in which the front millimeter-wave radar 38 or the rear millimeter-wave radar 40 has detected an approaching obstacle in the surroundings of the vehicle 12.

As another example, the assistance state determination section 56 may acquire information regarding content being displayed on the center display 36, and determine whether or not an assisted driving condition has been satisfied based on this information. Namely, the assistance state determination section 56 may determine that an assisted driving condition has been satisfied in cases in which an instruction to output a surroundings image used during driving assistance has been made using the center display 36.

In cases in which the assistance state determination section 56 has determined that a predetermined assisted driving condition has been satisfied, the image display section 58 displays on the center display 36 an overlaid image in which an assistance image is overlaid on a surroundings image acquired by the image acquisition section 50. For example, the image display section 58 may display the overlaid image illustrated in FIG. 5B on the center display 36 when the shift lever has been moved to the reverse range (R range). Namely, the image display section 58 displays an overlaid image to provide driving assistance while reversing.

As another example, in cases in which the camera switchover switch has been operated to instruct display of a vehicle-rearward image on the center display 36, the image display section 58 may display on the center display 36 an assistance image overlaid on a captured image captured by the rear camera 30. In such cases, an icon for changing the angle of view icon, a frame surrounding a following vehicle, or the like may be displayed overlaid in a similar manner to the assistance image.

As another example, in cases in which detection has been made that another vehicle is approaching the front-right of the vehicle 12 based on a signal from the front millimeter-wave radar 38, the image display section 58 may display on the center display 36 an assistance image overlaid on a captured image captured by the front camera 28. In such cases, the assistance image may be an overlaid display of an arrow or the like to indicate the direction of the other vehicle, or a mark to prompt caution.

In an assisted driving state in which an overlaid image is being displayed on the center display 36, the image recording section 60 temporarily records the overlaid image at the RAM 18. When not in an assisted driving state, the image recording section 60 temporarily records at the RAM 18 an image that has been subjected to image processing including processing to render a state in which no assistance image is visible. Specific explanation follows regarding the functionality of the image recording section 60.

In cases in which the shift lever has been moved to the reverse range (R range), the assistance state determination section 56 determines that an assisted driving condition has been satisfied, and the overlaid image illustrated in FIG. 5B is displayed on the center display 36. When this is performed, the image recording section 60 temporarily records at the RAM 18 the overlaid image as displayed on the center display 36. For example, the image recording section 60 sequentially records at the RAM 18 overlaid images in which assistance images are overlaid on images captured every 100 milliseconds. The length of time for which these recorded images remain in the RAM 18 is for example between 20 and 30 seconds. The RAM 18 therefore contains 200 to 300 frames worth of sequentially recorded images, which are sequentially deleted starting from the oldest image.

Figure 6A:
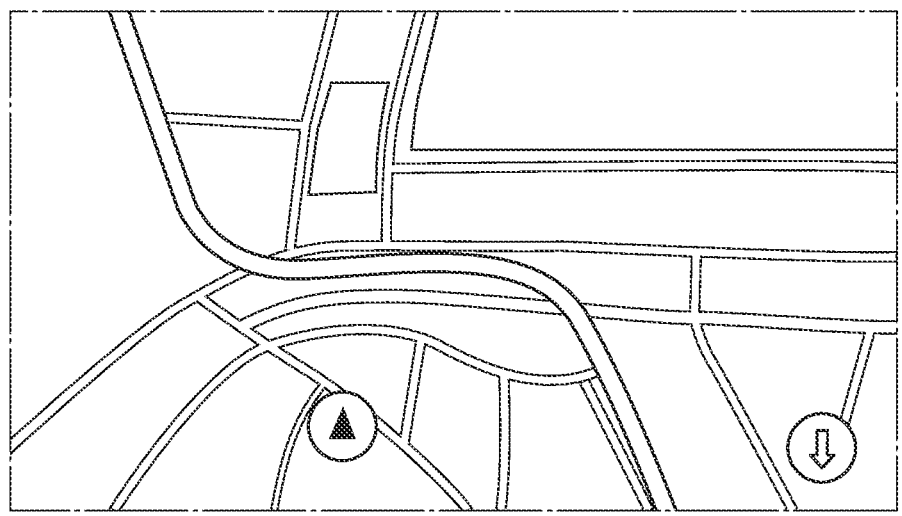
FIG. 6A is a diagram illustrating an example of a reproduced image displayed on a center display.
Figure 6B:
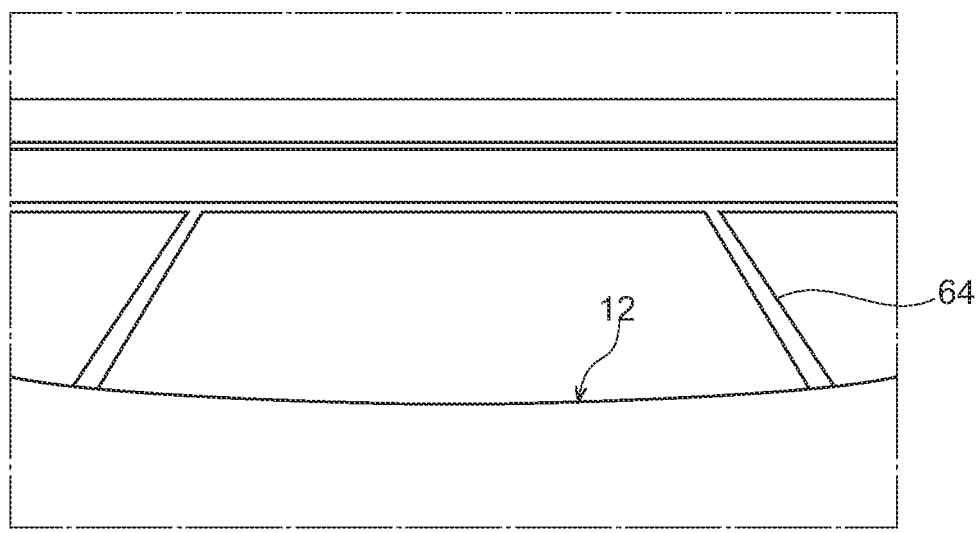
FIG. 6B is a diagram illustrating an example of a reproduced image recorded in storage.

In cases in which navigation system information such as that illustrated in FIG. 6A is being displayed on the center display 36, this indicates that images captured by the front camera 28, the rear camera 30, the left camera 32, or the right camera 34 are not being displayed. In cases in which multimedia information is being displayed on the center display 36, this also indicates that images captured by the front camera 28, the rear camera 30, the left camera 32, or the right camera 34 are not being displayed. In such cases, the image recording section 60 temporarily records at the RAM 18 an image obtained by subjecting an overlaid image to image processing. Specifically, an image that has been subjected to image processing to render the overlaid image in a state in which no assistance image is visible is temporarily recorded in the RAM 18. For example, processing is performed to remove the guide lines M1 and the icons M2, these being assistance images, from the overlaid image illustrated in FIG. 5B, and only a processed image such as that illustrated in FIG. 6B is temporarily recorded in the RAM 18.

Alternatively, the image recording section 60 may perform image processing on the overlaid image illustrated in FIG. 5B to make the guide lines M1 and the icons M2, these being assistance images, transparent or semi-transparent, and then temporarily record the processed image at the RAM 18. After performing such processing on the overlaid image illustrated in FIG. 5B to make the guide lines M1 and the icons M2 transparent, the processed image becomes the image illustrated in FIG. 6B.

When recording an image at the RAM 18, the image recording section 60 may record an extracted image corresponding to a partial angle of view. For example, the image recording section 60 may extract a partial angle of view from the angle of view AR1 of the front camera 28 illustrated in FIG. 3, and only record in the RAM 18 an image corresponding to the angle of view illustrated by an extracted angle of view AR5. Similarly, the image recording section 60 may extract a partial angle of view from the angle of view AR2 of the rear camera 30, and only record in the RAM 18 an image corresponding to the angle of view illustrated by an extracted angle of view AR6.

The event image retention section 62 illustrated in FIG. 4 retains in the storage 20 some of the images that have been temporarily recorded in the RAM 18 in cases in which a predetermined event has occurred. Predetermined events includes cases in which the acceleration sensor has detected sudden acceleration or sudden deceleration, cases in which the load sensor has detected a collision load being applied to the vehicle 12, and so on.

In cases in which a predetermined event has occurred, the event image retention section 62 retains in the storage 20 images that have been temporarily recorded in the RAM 18 over a period covering several seconds to several tens of seconds before and after the point in time at which the event occurred. In addition to the image data, the event image retention section 62 also retains the point in time at which the event occurred, data from the sensor set, and so on.

Operation

Next, explanation follows regarding operation of the present exemplary embodiment.

Example of Image Recording Processing

Figure 7:
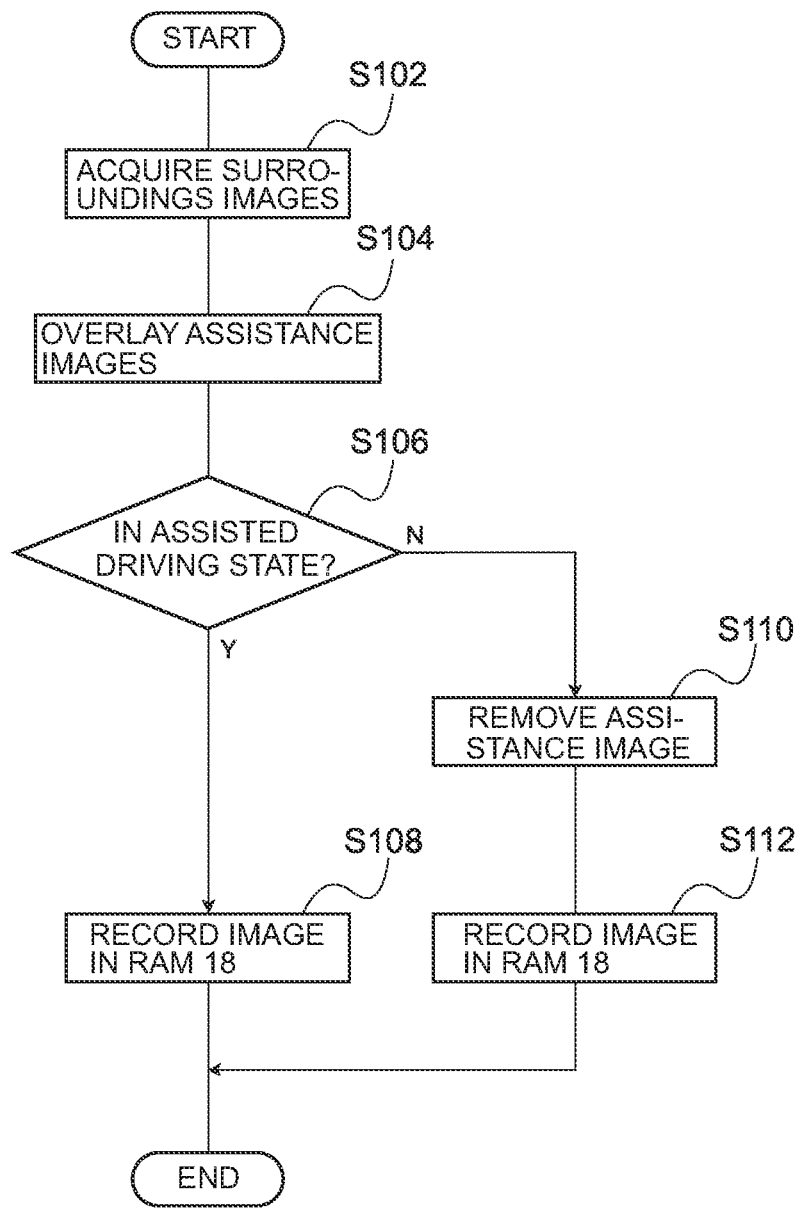
FIG. 7 is a flowchart illustrating an example of a flow of image recording processing of the first exemplary embodiment.

FIG. 7 is a flowchart illustrating an example of a flow of image recording processing by the image recording device for a vehicle 10. The image recording processing is executed by the CPU 14 reading a program from the ROM 16 or the storage 20, and expanding and executing this program in the RAM 18.

As illustrated in FIG. 7, at step S102, the CPU 14 acquires images of the surroundings of the vehicle 12. Specifically, using the functionality of the image acquisition section 50, the CPU 14 acquires images captured by the front camera 28, the rear camera 30, the left camera 32, and the right camera 34. As an example, in the present exemplary embodiment images captured by the left camera 32 and the right camera 34 are not recorded in the RAM 18. Thus, at step S102, the CPU 14 acquires a vehicle-forward image captured by the front camera 28 and a vehicle-rearward image captured by the rear camera 30.

At step S104, the CPU 14 overlays assistance images on the captured images. Specifically, the CPU 14 uses the functionality of the overlay processing section 52 to overlay assistance images on the captured images. For example, the CPU 14 performs overlay processing to overlay the guide lines M1 and the icons M2 on the vehicle-rearward image illustrated in FIG. 5A to create the overlaid image illustrated in FIG. 5B. Similarly, the CPU 14 uses the functionality of the overlay processing section 52 to perform overlay processing so as to overlay guide lines and icons on the vehicle-forward image in order to create an overlaid image.

At step S106, the CPU 14 determines whether or not an assisted driving state is in effect. Specifically, in cases in which a state in which driving is being assisted by display of an overlaid image on the center display 36 is determined to be in effect by the functionality of the assistance state determination section 56, the CPU 14 makes an affirmative determination at step S106, and processing transitions to step S108. On the other hand, in cases in which navigation system information, multimedia information, or the like is being displayed on the center display 36, the CPU 14 makes a negative determination at step S106, and processing transitions to step S110. Even in cases in which driving assistance is being performed, if an overlaid image is not being displayed on the center display 36 the CPU 14 makes a negative determination at step S106, and processing transitions to step S112.

In cases in which an affirmative determination is made at step S106, at step S108, the CPU 14 uses the functionality of the image recording section 60 to temporarily record the overlaid image being displayed on the center display 36 in the RAM 18. The CPU 14 then ends the image recording processing.

In cases in which negative determination is made at step S106, at step S110, the CPU 14 removes the assistance image from the overlaid image. The CPU 14 then temporarily records the image obtained by removing the assistance image from the overlaid image at the RAM 18 at step S112. The CPU 14 then ends the image recording processing.

Note that at step S110, the CPU 14 may perform image processing to make the assistance image transparent or semi-transparent instead of processing to remove the assistance image from the overlaid image.

As described above, in the image recording device for a vehicle 10 according to the present exemplary embodiment, the image display section 58 displays an overlaid image on the center display 36 inside the vehicle cabin when a predetermined assisted driving condition has been satisfied. Driving assistance is thereby provided to the occupant.

In an assisted driving state in which an overlaid image is being displayed in the display region, the image recording section 60 records the overlaid image at the RAM 18. When not in an assisted driving state, the image recording section 60 records an image in the RAM 18 in a state in which no assistance image is visible. This approach is capable of suppressing a situation in which an assistance image overlaid on the image recorded in the RAM 18 makes the situation in the vehicle surroundings difficult to see. Moreover, since drive recorder images are recorded using driving assistance cameras that capture the surroundings of the vehicle 12, there is no need to provide dedicated cameras for a drive recorder. This enables drive recorder images to be recorded at low cost.

Moreover, in the present exemplary embodiment, when not in an assisted driving state only surroundings images from which assistance images have been removed are recorded in the RAM 18. This enables any annoyance caused by overlaid assistance images, for example when checking recorded images, to be alleviated. Note that in cases in which images in which the assistance images have been made transparent or semi-transparent are recorded in the RAM 18, the visibility of obstacles and so on in the vehicle surroundings can be similarly improved when checking recorded images or the like in comparison to overlaid images on which image processing has not been performed.

Second Exemplary Embodiment

Next, explanation follows regarding a image recording device for a vehicle 70 according to a second exemplary embodiment. Note that configuration similar to that of the first exemplary embodiment is allocated the same reference numerals, and explanation thereof is omitted as appropriate.

Figure 8:
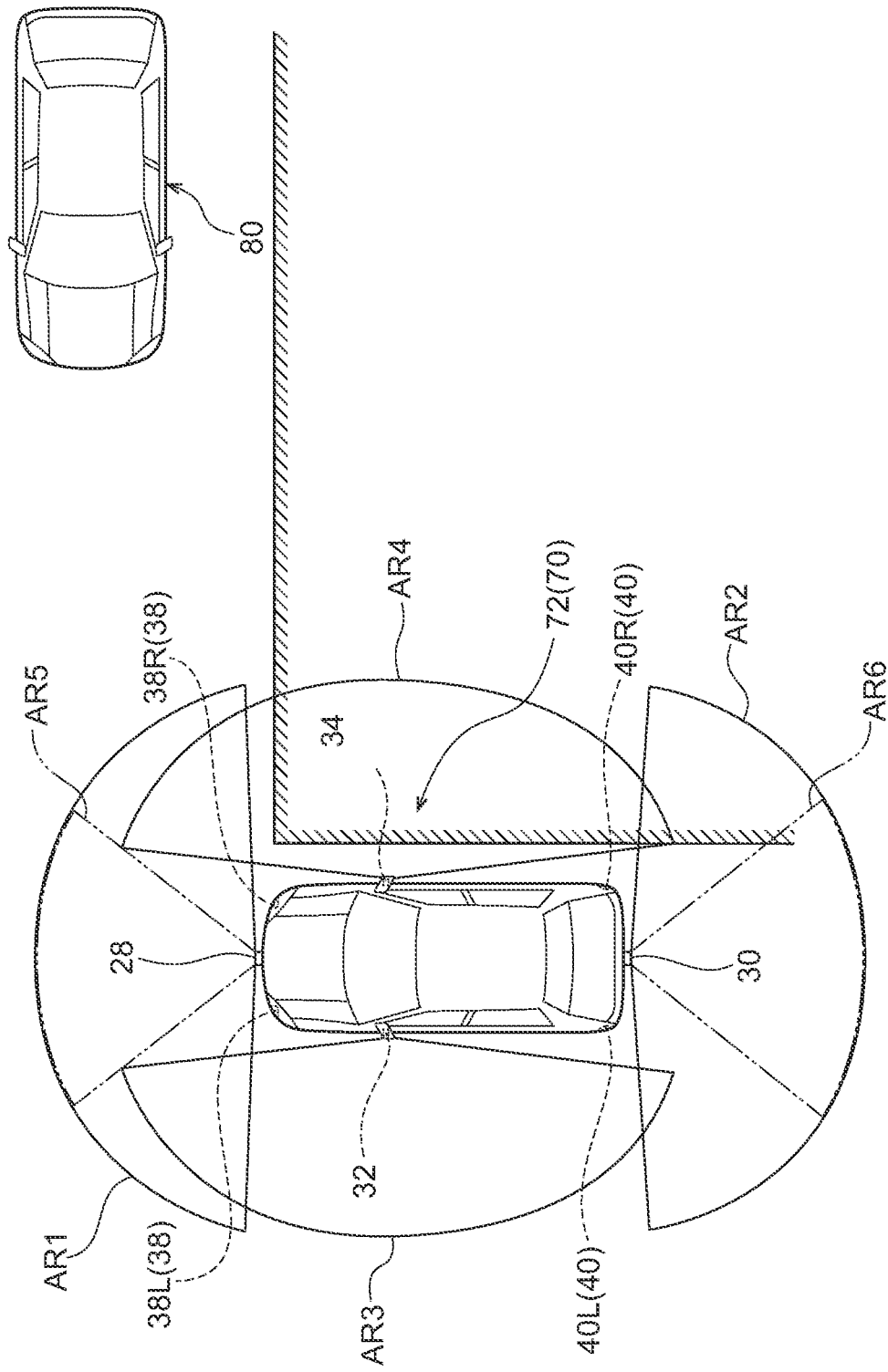
FIG. 8 is a plan view illustrating a vehicle applied with a image recording device for a vehicle according to a second exemplary embodiment, and another vehicle approaching this vehicle.

A vehicle 72 applied with the image recording device for a vehicle 70 of the present exemplary embodiment as illustrated in FIG. 8 has the hardware configuration illustrated in FIG. 1, similarly to in the first exemplary embodiment. The image recording device for a vehicle 70 of the present exemplary embodiment also includes the functional configuration illustrated in FIG. 4, similarly to in the first exemplary embodiment.

In the present exemplary embodiment, in cases in which a vehicle surroundings image is not being displayed on the center display 36, the image recording section 60 performs angle of view extraction processing to extract a partial angle of view, and temporarily records a resulting extracted image at the RAM 18. Namely, the image recording section 60 extracts a partial angle of view from the angle of view AR1 of the front camera 28 illustrated in FIG. 8, and records at the RAM 18 an image corresponding to the angle of view illustrated by the extracted angle of view AR5. The image recording section 60 also extracts a partial an angle of view from the angle of view AR2 of the rear camera 30 and records at the RAM 18 an image corresponding to the angle of view illustrated by the extracted angle of view AR6.

Furthermore, in the present exemplary embodiment, in cases in which an obstacle approaching the vehicle 72 has been detected outside the angles of view of the extracted images based on information acquired by the obstacle acquisition section 54, the image recording section 60 records images in the RAM 18 without performing the angle of view extraction processing thereon.

Explanation follows regarding this processing in a case in which another vehicle 80 is approaching at an intersection or the like, as illustrated in FIG. 8. In this case, the other vehicle 80 that is approaching the vehicle 72 is detected by the front-right millimeter-wave radar 38R. Note that in cases in which the position of the other vehicle 80 is outside the extracted angle of view AR5 of the front camera 28, the image recording section 60 records an image corresponding to the angle of view AR1 in the RAM 18 without performing the angle of view extraction processing.

Operation

Explanation follows regarding operation of the present exemplary embodiment.

Example of Image Recording Processing

FIG. 9 is a flowchart illustrating an example of a flow of image recording processing by the image recording device for a vehicle 10. The image recording processing is executed by the CPU 14 reading a program from the ROM 16 or the storage 20, and expanding and executing this program in the RAM 18. The flowchart is explained with reference to an example of a case in which the other vehicle 80 is approaching from the right, as illustrated in FIG. 8.

As illustrated in FIG. 9, the processing of step S202 to step S208 is similar to the processing of step S102 to step S108 in FIG. 7. Namely, at step S206, the CPU 14 determines whether or not an assisted driving state is in effect. If an assisted driving state is in effect, at step S208, an overlaid image being displayed on the center display 36 is temporarily recorded in the RAM 18 using the functionality of the image recording section 60. The CPU 14 then ends the image recording processing.

On the other hand, in cases in which navigation system information, multimedia information, or the like is being displayed on the center display 36, the CPU 14 makes a negative determination at step S206 and processing transitions to step S212. Even in cases in which driving assistance is being performed, if an overlaid image is not being displayed on the center display 36, the CPU 14 makes a negative determination at step S206 and processing transitions to step S212.

At step S212, the CPU 14 determines whether or not a vehicle is approaching. Specifically, in cases in which another vehicle or the like approaching the vehicle 72 has been detected using the functionality of the obstacle acquisition section 54, the CPU 14 makes an affirmative determination at step S212. In the state illustrated in FIG. 8, the other vehicle 80 has been detected approaching the vehicle 72 by the front-right millimeter-wave radar 38R, and so the CPU 14 makes an affirmative determination at step S212 and processing transitions to step S216.

On the other hand, in cases in which another vehicle or the like approaching the vehicle 72 has not been detected using the functionality of the obstacle acquisition section 54 at step S212, the CPU 14 makes a negative determination at step S212 and processing transitions to step S214. At step S214, the CPU 14 performs angle of view extraction. Specifically, the CPU 14 performs angle of view extraction processing to extract a partial angle of view from the angle of view that is being imaged. In the example illustrated in FIG. 8, a partial angle of view is extracted from the angle of view AR1 of the front camera 28 to give the extracted angle of view AR5.

As another example, in cases in which the rear-left millimeter-wave radar 40L has detected another vehicle approaching the vehicle 72, the CPU 14 extracts a partial angle of view from the angle of view AR2 of the rear camera 30 to give the extracted angle of view AR6.

At step S216, the CPU 14 removes the assistance image from the overlaid image. After removing the assistance image from the overlaid image, the CPU 14 temporarily records the resulting image at the RAM 18 at step S218.

Note that in cases in which affirmative determination is made at step S212, the CPU 14 executes the processing of step S216 and step S218 without executing the processing of step S214. Thus, in cases in which the other vehicle 80 is approaching, an image corresponding to the angle of view AR1, this being a wide angle of view, is recorded in the RAM 18.

On the other hand, in cases in which negative determination is made at step S212, the CPU 14 executes the processing of step S216 and step S218 after first executing the processing of step S214. Thus, in cases in which there is no other vehicle 80 approaching, an image corresponding to the extracted angle of view AR5, this being a narrow angle of view, is recorded in the RAM 18.

As described above, in the present exemplary embodiment, in cases in which an assisted driving state is not in effect, a partial angle of view is extracted from the overlaid image, and the resulting extracted image is recorded in the RAM 18. Note that an image with a narrow angle of view generally appears more natural than an image with a wide angle of view. Thus, due to recording as a recorded image an extracted image with a narrow angle of view extracted from the overlaid image as a partial angle of view, the recorded image will have a more natural appearance when performing image checking or the like.

Moreover, in the present exemplary embodiment, the angle of view extraction processing is not performed in cases in which an obstacle such as the other vehicle 80 approaching the vehicle 72 has been detected outside the angle of view of the extracted image. Thus, in cases in which an obstacle is approaching, an image with a wide angle of view is recorded, thereby enabling the positional relationship between the obstacle and the vehicle 72 to be checked using this recorded image. Other operation is similar to that in the first exemplary embodiment.

Although the image recording device for a vehicles 10, 70 according to the first exemplary embodiment and second exemplary embodiment have been described above, obviously various modifications may be implemented within a range not departing from the spirit of the present disclosure. For example, although the image acquisition section 50 acquires images captured by the front camera 28, the rear camera 30, the left camera 32, and the right camera 34 in the above exemplary embodiments, there is no limitation thereto. Namely, configuration may be made such that only images acquired by the front camera 28 and the rear camera 30 are acquired. Alternatively, a separate camera to the front camera 28, the rear camera 30, the left camera 32, and the right camera 34 may be installed, and images captured by this camera may be acquired.

Moreover, although the image display section 58 displays an overlaid image on the center display 36 in the above exemplary embodiments, there is no limitation thereto. For example, in cases in which a head-up display (HUD) is installed in addition to the center display 36, an overlaid image may be displayed in the display region of this HUD.

Moreover, although the image recording section 60 temporarily records an image captured by the front camera 28 and an image captured by the rear camera 30 in the RAM 18 in the above exemplary embodiments, there is no limitation thereto. For example, images captured by the left camera 32 and the right camera 34 may additionally be temporarily recorded in the RAM 18.

Furthermore, although images are temporarily recorded in the RAM 18 serving as a recording section, and some of the images temporarily recorded in the RAM 18 are retained in the storage 20 when an event has occurred in the above exemplary embodiments, there is no limitation thereto. For example, configuration may be made such that the storage 20 is partitioned into plural storage regions, images are temporarily recorded in one of these storage regions, and some of these images are retained in another of these storage regions when an event has occurred. Alternatively, images may be recorded on a non-transitory recording medium such as a memory card, a compact disc (CD), a digital versatile disc (DVD), or universal serial bus (USB) memory.

Moreover, the processing executed by the CPU 14 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The image recording processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

What is claimed is:

1. An image recording device for a vehicle comprising:
a processor configured to:
acquire a surroundings image in which vehicle surroundings have been captured;
display an overlaid image in a display region inside a vehicle cabin in a case in which a predetermined assisted driving condition has been satisfied, the overlaid image being configured by an assistance image overlaid on the acquired surroundings image; and
record the overlaid image at a recording section during an assisted driving state in which the overlaid image is being displayed in the display region, and, in a case in which the assisted driving state is not in effect, record at the recording section an image that has been subjected to image processing including processing to render a state in which the assistance image is not visible,
wherein, in a case in which the assisted driving state is not in effect, the processor is configured to record at the recording section only the surroundings image, with the assistance image having been removed from the overlaid image,
wherein in a case in which the assisted driving state is not in effect, the processor is configured to record at the recording section an extracted image that has been subjected to angle of view extraction processing to extract a partial angle of view from the overlaid image that is employed for display in the display region when the assisted driving state is in effect; and
wherein the processor is further configured to acquire information regarding an obstacle from a surroundings detection sensor configured to detect obstacles in vehicle surroundings, and wherein:
in a case in which an obstacle approaching a host vehicle has been detected outside an angle of view of the extracted image based on acquired information, the processor is configured to record at the recording section an image that has not been subjected to the angle of view extraction processing.

2. An image recording device for a vehicle, comprising:
a processor configured to:
acquire a surroundings image in which vehicle surroundings have been captured;
display an overlaid image in a display region inside a vehicle cabin in a case in which a predetermined assisted driving condition has been satisfied, the overlaid image being configured by an assistance image overlaid on the acquired surroundings image; and
record the overlaid image at a recording section during an assisted driving state in which the overlaid image is being displayed in the display region, and, in a case in which the assisted driving state is not in effect, record at the recording section an image that has been subjected to image processing including processing to render a state in which the assistance image is not visible,
wherein, in a case in which the assisted driving state is not in effect, the processor is configured to record at the recording section an image that has been subjected to image processing to make the assistance image transparent or semi-transparent; and wherein, in a case in which the assisted driving state is not in effect, the processor is configured to record at the recording section an extracted image that has been subjected to angle of view extraction processing, to extract a partial angle of view from the overlaid image that is employed for display in the display region when the assisted driving state is in effect.

3. The image recording device for a vehicle of claim 2, wherein the processor is further configured to acquire information regarding an obstacle from a surroundings detection sensor configured to detect obstacles in vehicle surroundings, wherein:

in a case in which an obstacle approaching a host vehicle has been detected outside an angle of view of the extracted image based on acquired information, the processor is configured to record at the recording section an image that has not been subjected to the angle of view extraction processing.

\* \* \* \* \*